Patented Dec. 19, 1944

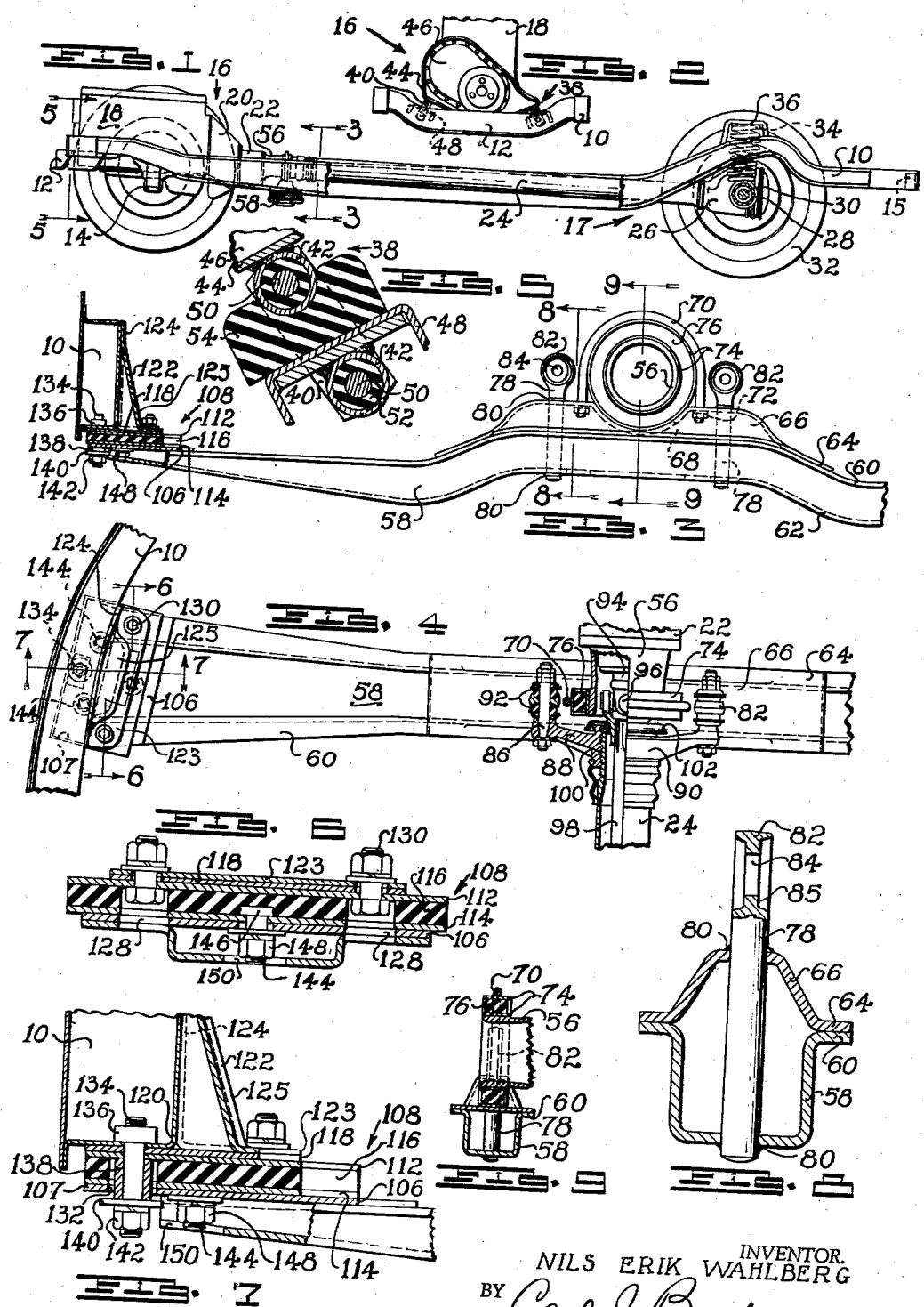

2,365,609

UNITED STATES PATENT OFFICE 2,365,609

AUTOMOTIVE RUNNING GEAR

Nils Erik Wahlberg, Chicago, Ill., assignor to Nash-Kelvinator Corporation, Kenosha, Wis., a corporation of Maryland Application January 10, 1942, Serial No. 426,296

13 Claims. (Cl. 180—85)

This invention relates to the running gear of an automobile and has particular reference to means for preventing motor vibrations and road shocks from being transmitted to the frame of the automobile.

The parts of an automobile may be classified for the purpose of this description as a frame member which supports the occupants of the vehicle and the running gear which supports the frame and provides the driving force for moving the vehicle. The running gear may further be subdivided into a power unit for developing the power necessary to drive the vehicle and a driving unit including driving road wheels and connecting structure for transforming the power from the power unit to thrust forces at the driving wheels and for transmitting thrust forces to the frame. The power unit includes a motor, clutch and change speed gearing.

It is an object of this invention to provide a single supporting member attachable to the frame of an automobile which will transmit the thrust loads to the frame and also support the power unit on the frame.

It is another object of this invention to provide a novel connection between the power unit of an automobile and the member which supports the power unit on the frame, which connection will insulate the power unit from the frame and permit the motor to oscillate about a longitudinal axis relative to the frame.

It is another object of this invention to provide a novel connection between the frame of an automobile and the supporting member for the power unit of the automobile, which connection will transmit vertically and longitudinally directed loads and will also insulate the supporting member from the frame.

It is another object of this invention to provide a supporting member on the frame of an automobile which is arranged to receive the thrust loads from the driving unit of the automobile and to also support the power unit of the automobile so that it will not be affected by the thrust loads.

It is another object of this invention to provide a support for the adjacent ends of a driving unit and power unit of an automobile which permits the transmission of rotative power between the units and permits the units to rotate relative to each other about a horizontal axis extending transversely of the automobile.

Other objects and advantages of this invention will be apparent from a consideration of the following description and claims and the attached drawing, of which there is one sheet, and in which—

Figure 1 represents a side elevational view of the frame of an automobile with the power unit and driving unit in place thereon;

Figure 2 represents a front elevation of the power unit illustrating the connection between the front of the power unit and the frame;

Figure 3 represents a vertical, transverse, sectional view through the frame and taken along a plane indicated by the line 3—3 in Figure 1 and looking in the direction of the arrows and illustrating the method of supporting the rear end of the power unit on the frame;

Figure 4 represents a plan view partially broken away of the frame and supporting member and illustrates the rear end of the power unit and the forward end of the driving unit as attached to the supporting member;

Figure 5 represents a vertical sectional view, taken along a plane indicated by the line 5—5 in Figure 1 and looking in the direction of the arrows, illustrating the construction of the mounting brackets for the front end of the power unit;

Figure 6 represents a sectional view taken along a plane indicated by the line 6—6 in Figure 4 and looking in the direction of the arrows;

Figure 7 represents a vertical sectional view taken along a plane indicated by the line 7—7 in Figure 4 and looking in the direction of the arrows;

Figure 8 represents a vertical sectional view through the supporting member and is taken along the plane of the line 8—8 in Figure 3 and looking in the direction of the arrows;

Figure 9 represents a vertical sectional view taken along a plane indicated by the line 9—9 in Figure 3 and looking in the direction of the arrows.

Figure 1 illustrates the frame members of an automobile consisting of longitudinally extending side rails 10 joined together by a front cross member 12, an axle 14 and a rear cross member 15. The frame members may be assembled as part of a separate chassis frame or may be built directly into the body of the automobile (not shown). The running gear of the automobile consists of a power unit generally indicated at 16 and a driving unit generally indicated at 17. The power unit 16 consists of a motor 18 provided with a clutch 20 and transmission 22. The driving unit 17 consists of a torque tube 24 connected at its rear end to a differential housing 26 from each side of which extends the rear axle housings 28. The rear axle housings 28 enclose the axles 30 to which are connected the driving wheels 32. The axle housings support the rear end of the frame by means of coil springs 34 extending upwardly to a downwardly opening, generally channel shaped cross member 36 secured to the side rails 10.

The forward end of the power unit is supported upon the forward cross member 12 by means of mounting brackets generally indicated at 38 (see Figure 2) and which are more clearly illustrated in Figure 5. Each of the supporting brackets 38 comprises a pair of links 40 which extend between a pair of generally longitudinally extending tubes 42. The upper tube 42 is secured as by welding to the underside of the flange 44 bent forwardly from the plate 46 secured on the forward end of the motor 18. The lower tube 42 is secured as by welding to the underside of a generally channel shaped bracket 48 secured to the rear face of the front cross member 12. Bolts 50 extend through the tubes 42 and the ends of the links 40 and clamp the links to the tubes. Sleeves 52 of rubber or other deformable material are positioned within the tubes 42 and around the bolts 50 to insulate the bolts from the tubes.

The sleeves 52 are longer than the tubes 42 so that when the bolts 50 are tightened, the ends of the links 40 will compress the ends of the sleeves 52, causing the central portions of the sleeves to expand tightly into contact with the bolts 50 and the insides of the tubes 42. The sleeves of rubber 52 thus effectively insulate the motor from the frame while flexing of the rubber will permit oscillation of the motor relative to the frame under the torque reaction forces of the motor. A block 54 of rubber or other deformable material is positioned between the top of the bracket 48 and the upper tube 42 to limit the distance the links may rock about the lower bolts 50 as an axis and to further cushion the oscillation of the motor.

The front axle 14 is arranged to be connected to the front wheels by a suspension system such as is disclosed and claimed in the co-pending application of Nils Erik Wahlberg, Floyd F. Kishline, and Wallace S. Berry, for a Front suspension, Serial No. 370,286, filed November 14, 1940, which has since issued as United States Letters Patent No. 2,325,894, dated September 3, 1943.

The rear end of the transmission 22 has secured thereto a rigid tubular member 56 which extends over the support member 58. The support member 58 has an upwardly opening, generally channel shaped cross section with flanges 60 turned outwardly from the upper edges thereof. The central portion of the cross member 58 is bent upwardly as at 62 (see Figure 3) and is provided with a cover plate 64 along the center thereof which is welded to the flanges 60. The cover plate 64 is formed as by stamping to have a centrally raised portion 66 defining the semi-cylindrical saddle 68. The saddle 68 is arranged to support the rear end of the tubular member 56 secured to the transmission and the tubular member is held in place in the saddle by means of a U-bolt 70 secured to the plate 64 by the nuts 72.

An insulator consisting of inner and outer cylindrical bands 74 spaced by an annular ring of rubber 76 is positioned around the end of the tubular member 56 and insulates the tubular member from the saddle 68 and U-bolt 70. Torsional flexing in the rubber ring 76 permits the tubular member 56, which is rigidly attached to the motor, to rotate slightly relative to the cross member 58 under the torque reaction forces of the motor. The rubber ring further supports the load of the rear end of the power unit and insulates the unit from the cross member and side rails. It is desirable to have the rubber ring 76 bonded to the surfaces of the bands 74.

The raised portion 66 on the cover plate 64 is apertured to pass a pair of pins 78 which extend downwardly through the bottom wall of the support member 58 and which are welded as at 80 to the support member and the raised portion 66. The upper ends of the pins 78 are formed into eyes 82 defining apertures 84 and shoulders 85 around the apertures on each side of the eyes. The eyes 82 are arranged to receive the transversely spaced, longitudinally extending bolts 86, the diameter of the bolts being smaller than the diameter of the apertures. The rear ends of the bolts 86 are rigidly secured to the arms 88 of a trunnion 90 threaded on the forward end of a torque tube 24. Rubber biscuits 92 are seated against the shoulders 85 on each side of the eyes 82 and around the bolts 86 to effectively insulate the bolts and the forward end of the torque tube from the support member 58 and at the same time permit rotation of the torque tube in a vertical plane about the centers of the eyes 82 as an axis. The biscuits 92 will also transmit axially directed thrust from the rear wheels 32 and the torque tube 24 to the support member 58.

The tail shaft 94 of the transmission 22 (see Figure 4) extends backwardly through the tubular member 56 and is connected by means of a universal joint 96 to the forward end of a propeller shaft 98 enclosed within the torque tube 24. It will be noted that the trunnion 90, having a threaded connection at 100 with the torque tube 24, will permit the torque tube to rotate relative to the trunnion while at the same time transmitting axially directed forces thereto. A dust slinger ring 102 is carried by the universal joint 96 adjacent to the forward end of the torque tube and serves to prevent dust and water from being blown into the torque tube 24. It should be noted that the universal joint 96 is positioned along a line passed between the eyes 82 so that rotation of the torque tube about its forward support as the rear wheels pass over bumps will not cause any misalignment of the shafts 94 and 98 in the tubular member 56 and torque tube 24, respectively.

Turning now to the construction of the connections between the supporting member 58 and the side rail members 10, it will be noted that the cross section of the supporting member 58 is decreased in depth and increased in width as it approaches the side rails 10. A cover plate 106 is secured as by welding to the flange 60 to close the ends of the support 58 into hollow box sections. The plate 106 also extends beyond the end of the supporting member as at 107 (see Figure 7).

A pad generally indicated at 108 is positioned between the plate 106 and the under surface of the side rail 10. The pad consists of an upper plate 112 and a lower plate 114 which are spaced from each other by a layer 116 of rubber or some similar deformable material. The rubber is bonded as by vulcanizing to the adjacent surfaces of the plates 112 and 114.

An extension plate 118 is secured to the underside of the side rail 10 as by welding and extends inwardly toward the center of the frame from the lower inside edge 120 of the side rail. The inner edge of the plate 118 is braced with respect to the side rail 10 by means of a bracket 122 welded to the inner side of the side rail. The bracket 122 consists of an angle plate having a lower flange 123 and an upper flange 124. The upper flange 124 is pressed inwardly toward the center of the automobile as at 125 so as to form an upwardly and outwardly sloping reinforcing rib. The upper flange is secured as by welding to the inner side of the side rail 10 and the lower flange 123 is welded to the top of the extension plate 118. The plate 118 and bracket 122 function to provide a surface to which the support member 58 may be attached, which is broader than the under surface of the side rail 10. They also distribute some of the load of the support member along the inside wall of the side rail.

The plates 106 and 114 and flanges 60 of the support member are apertured as at 128 (see Figure 6) to pass the bolts 130 which clamp the upper plate 112 of the pad 108 to the plate 118 on the underside of the side rail and the flange 123 on the bracket 122. The plates 106 and 114 are also apertured as at 132 (see Figure 7) to pass the stud bolt 134 which extends upwardly through the plates 112, 118 and the bottom wall of the side rail 10 to a tapped block 136 welded to the inside of the side rail 10. It will be noted that the rubber 116 is also apertured along with the plates. A sleeve 138 is positioned around the stud bolt 134 and bears against the underside of the top plate 112 of the pad 108. The sleeve 138 is held in place by a washer 140 and drawn tight by the nut 142. It will be noted that the washer 140 is wider in diameter than the apertures 132 so that should the bond between the rubber 116 and the plates 112 and 114 fail, permitting the lower plate 114 to fall, the plate will come to rest upon the washer 140 which thus acts as a safety support for the support member 58.

The lower plate 114 of the pad 108 has projecting from the underside thereof (see Figures 4 and 6) the three bolts 144 which have their heads 146 welded to the upper surface of the plate 114. These bolts 144 extend through apertures in the plate 106 and are secured thereto by the nut 148. The lower wall of the support member 58 is cut away as at 150 to permit access to the nuts 148.

It will thus be seen that the upper plate 112 of the pad 108 is rigidly secured to the side rail 10 while the lower plate 114 is rigidly secured to the support member 58. The plates 112 and 114 are separated by the rubber 116 so that the support member 58 and the weight of the rear end of the power unit are supported on the frame by tension loads in the rubber 116. Since rubber under tension is an effective sound deadening material, the pad 108 will transmit very little motor noise to the frame of the automobile.

Besides functioning to support the rear end of the power unit, the pad 108 serves to transmit thrust forces from the torque tube 24 and support member 58 to the frame 10. It will be noted that the pad 108 has a relatively large horizontal area so that the shear stresses in the rubber 116, resulting from these thrust loads, do not exceed the strength of the bond between the rubber and the plates 112 and 114. Thus the thrust forces from the torque tube and rear driving wheels are transmitted through the support member 58 and pad 108 to the frame through rubber under shear so that road shocks and vibrations are prevented from reaching the frame.

While I have described my invention in some detail, I intend this description to be an example only and not as a limitation of my invention, to which I make the following claims:

1. In an automobile having a power unit, a driving unit and side rails, a support member extending between said side rails, said support member having a channel shaped cross section and having a raised central portion, a cover plate attached to said central portion, said cover plate being shaped to form a saddle arranged to support said power unit, and means extending through said support member and the ends of said saddle on each side of said saddle for supporting said driving unit on said support member.

2. In an automobile having a power unit, a driving unit and side rails, a support member extending between said side rails and having a channel shaped cross section, a cover plate secured to said support member, means attached to said cover plate for attaching said power unit thereto, means positioned on each side of said last mentioned means and extending through said support member and said plate for connecting said driving unit to said support member, shafts in said driving unit and said power unit, and a universal joint connecting said shafts and positioned along a line between said means for connecting said driving unit to said support member.

3. In an automobile, a power unit, a driving unit, a frame member, a support member extending from between the adjacent ends of said power unit and said driving unit to the sides of said frame member, means including a deformable pad for connecting said support member with said frame member, means including a deformable ring for connecting said power unit to said support member, and means separate from said power-unit-to-support-member connection including deformable biscuits positioned on each side of said deformable ring for connecting said driving unit to said support member.

4. In an automobile, a power unit, a driving unit, a frame member, a support member extending from between the adjacent ends of said power unit and said driving unit to the sides of said frame member, means including a deformable pad for connecting said support member with said frame member, means including a deformable ring for connecting one of said units to said support member, and means including deformable biscuits positioned on each side of and independent of said deformable ring for connecting the other of said units to said support member.

5. In an automobile having frame members, a power unit, a driving unit, a support member, pads for attaching said support member to said frame members, said pads including plates having deformable material bonded therebetween, means for supporting said power unit on said support member including deformable material, a trunnion rotatably secured to said driving unit and arranged to transmit axially directed forces from said driving unit through said deformable material to said support member, means connecting said trunnion to said support member and positioned along a horizontal line, and deformable cushioning means positioned around said last mentioned connecting means.

6. In an automobile having a power unit and a driving unit, a frame for supporting said units, a support member secured to said frame and extending under the adjacent ends of said units, a ring of deformable material positioned around a portion of said power unit and clamped to said support member, pins secured to said support member on either side of said ring and defining eyes, a trunnion rotatably secured to the end of said driving unit, connecting members extending from said trunnion through said eyes, and deformable biscuits positioned around said connecting members on each side of said eyes.

7. In an automobile having a power unit and a frame, means for supporting said power unit on said frame comprising a support member having an upwardly opening, channel shaped cross section and secured to said frame, a cover plate secured to said support member near the middle thereof, said cover plate having an upwardly raised portion defining an upwardly opening partially cylindrical saddle, a tubular member secured to said power unit and positioned over said saddle, a pair of concentric bands having deformable material bonded therebetween and positioned around said tubular member and resting in the partially cylindrical portion of said saddle, and clamping means extending partially around said pair of bands and secured to the raised portion of said plate.

8. In an automobile having a frame and a driving unit including a torque tube, means for supporting said torque tube on said frame comprising a support member positioned adjacent to the end of said torque tube, a pair of pins secured to said support member and on either side of the axis of said torque tube, said pins having a portion defining eyes, a trunnion having a threaded connection with the end of said torque tube, arms extending from said trunnion, and connecting pins rigidly secured to said arms and extending through said eyes.

9. In an automobile having side rail members and a driving unit including a torque tube, a support member extending between said side rail members and underneath the end of said torque tube, pins defining eyes secured to said support member on each side of the center thereof, connecting means between said pins and said torque tube, deformable members insulating said connecting means from said pins, spaced plates secured to said support member and to said frame member and positioned one above the other, a pad of deformable material positioned between said plates, means for clamping one of said plates to said side rail, and other means spaced from said last mentioned means for connecting said support member to the other of said plates.

10. In combination with an automobile having a power unit and a frame member, a support member for supporting said power unit from said frame member, said support member having a channel shaped cross section with flanges turned outwardly from the open side thereof, means for attaching said support member to said frame member comprising a cover plate secured to said flanges and extending beyond the end of said support member, an extension plate secured to said frame member and extending beyond the edge thereof, a reinforcing bracket having a flange secured to the side of said frame member and another flange secured to said extension plate, a pad positioned between said cover plate and said extension plate, said pad including upper and lower plates having deformable material bonded therebetween, said flanges on said support member, said cover plate, said lower plate and said deformable material defining aligned apertures, clamping means accessible through said apertures and clamping said flange on said bracket, said extension plate and said upper plate together, other clamping means secured to said frame member and extending through said pad and said cover plate, a spacer member positioned around said other clamping means, and means including a washer for holding said spacer member against said upper plate, said washer being spaced below and overlapping a portion of said cover plate.

11. Means for connecting a motor support member to the frame member of an automobile comprising an extension plate secured to said frame member and extending beyond the edge thereof, and a pad consisting of upper and lower plates having deformable material bonded therebetween, the upper plate of said pad being secured to said first mentioned plate and the lower plate of said pad being secured to said motor support member.

12. In an automobile having a power unit and a frame, means for supporting said power unit on said frame comprising a support member having an upwardly opening, channel shaped cross section, flanges turned outwardly from the edges of said support member, a cover plate secured to said flanges and extending beyond the end of said support member, an extension plate secured to the underside of said frame and extending beyond the edge thereof, and a pad comprising upper and lower plates having rubber bonded therebetween positioned between said cover plate and said extension plate, said upper plate of said pad being secured to said extension plate and said lower plate of said pad being secured to said cover plate.

13. A connection between the side rail and driving unit of an automobile comprising a support member, a pad including upper and lower plates spaced by deformable material and positioned between said side rail and said support member, clamping means for clamping said upper plate to said side rail, the other of said plates defining apertures through which said clamping means are accessible, other clamping means extending between said side rail and the opposite side of said plate from said side rail, a safety support member carried by said other clamping means and underlying a portion of said support member, means holding said safety support member in place, and means spacing said safety support from said upper plate.

NILS ERIK WAHLBERG.